US009689316B1

(12) United States Patent
Crom

(10) Patent No.: US 9,689,316 B1
(45) Date of Patent: Jun. 27, 2017

(54) GAS TURBINE ENGINE OVERSPEED PREVENTION

(71) Applicant: TUCSON EMBEDDED SYSTEMS, INC., Tucson, AZ (US)

(72) Inventor: Elden Crom, Tucson, AZ (US)

(73) Assignee: TUCSON EMBEDDED SYSTEMS, INC., Tucson, AZ (US)

(*) Notice: Subject to any disclaimer, the term of this patent is extended or adjusted under 35 U.S.C. 154(b) by 474 days.

(21) Appl. No.: 14/169,954

(22) Filed: Jan. 31, 2014

Related U.S. Application Data

(60) Provisional application No. 61/781,493, filed on Mar. 14, 2013.

(51) Int. Cl.
F02C 7/22 (2006.01)
F02C 9/22 (2006.01)
F02C 9/26 (2006.01)
F02C 9/18 (2006.01)

(52) U.S. Cl.
CPC .......... F02C 9/22 (2013.01); F02C 9/18 (2013.01); F02C 9/26 (2013.01); F05D 2270/021 (2013.01)

(58) Field of Classification Search
CPC ...... F02C 9/16; F02C 9/18; F02C 9/20; F02C 9/22; F02C 9/26; F02C 9/28; F02C 9/46; F02C 9/50; F02C 9/52; F02C 9/54; F05D 2270/021; F05D 2270/304
See application file for complete search history.

(56) References Cited

U.S. PATENT DOCUMENTS

| 3,038,306 A * | 6/1962 | Arne Loft ............... F01D 21/02 60/39.091 |
| 3,066,487 A * | 12/1962 | Ferguson, Jr. .......... F02C 7/272 60/788 |
| 4,039,804 A | 8/1977 | Reed et al. |
| 4,195,231 A * | 3/1980 | Reed ..................... F01K 23/105 290/40 R |
| 4,259,835 A | 4/1981 | Reed et al. |
| 4,283,634 A | 8/1981 | Yannone et al. |
| 4,308,463 A | 12/1981 | Giras et al. |
| 4,314,441 A | 2/1982 | Yannone et al. |
| 4,341,071 A | 7/1982 | Abo et al. |
| 5,550,410 A | 8/1996 | Titus |
| 5,635,768 A | 6/1997 | Birch et al. |
| 5,819,524 A | 10/1998 | Bosley et al. |

(Continued)

FOREIGN PATENT DOCUMENTS

EP 0680139 A1 11/1995
EP 1655456 B1 3/2013

OTHER PUBLICATIONS

Zepeda, Richard, et al.; "Capability Driven Architecture: An Approach to Airworthy Reusable Software", American Helicopter Society 63rd Annual Forum, Virginia Beach, VA, May 1-3, 2007, 10 pp.

(Continued)

Primary Examiner — Andrew Perreault
(74) Attorney, Agent, or Firm — Young Basile Hanlon & MacFarlane, P.C.

(57) ABSTRACT

A controller for a gas turbine engine is configured to respond to one or more prescribed engine overspeed conditions. Rather than shutting the engine down, the controller substantially reduces N1 airflow and substantially concurrently activates one or more engine igniters.

17 Claims, 4 Drawing Sheets

(56) References Cited

U.S. PATENT DOCUMENTS

| | | | |
|---|---|---|---|
| 6,198,174 | B1 | 3/2001 | Nims et al. |
| 6,307,278 | B1 | 10/2001 | Nims et al. |
| 6,405,522 | B1 | 6/2002 | Pont et al. |
| 6,666,027 | B1 | 12/2003 | Cardenas, Jr. |
| 6,786,051 | B2 | 9/2004 | Kristich et al. |
| 6,789,000 | B1 | 9/2004 | Munson, Jr. |
| 6,813,875 | B2 | 11/2004 | Inoue |
| 6,895,760 | B2 | 5/2005 | Kesseli |
| 6,906,432 | B2 | 6/2005 | Belokon et al. |
| 6,907,727 | B2 | 6/2005 | Turchetta |
| 6,941,217 | B1 | 9/2005 | Munson, Jr. |
| 7,043,905 | B2 | 5/2006 | Turchetta |
| 7,114,322 | B2 | 10/2006 | Yamanaka et al. |
| 7,424,360 | B1 | 9/2008 | Munson, Jr. |
| 7,461,510 | B1 | 12/2008 | Munson, Jr. |
| 7,472,542 | B2 | 1/2009 | Yamanaka et al. |
| 7,530,216 | B2 | 5/2009 | Tsuzuki et al. |
| 7,581,379 | B2 | 9/2009 | Yoshida et al. |
| 7,958,716 | B2 | 6/2011 | Ziegenfuss |
| 8,239,586 | B2 | 8/2012 | Crom et al. |
| 2006/0042259 | A1 | 3/2006 | Marushima et al. |
| 2012/0255734 | A1 | 10/2012 | Coli et al. |
| 2013/0167802 | A1* | 7/2013 | Uchiyama ............. F02D 31/005 123/339.23 |
| 2014/0060066 | A1* | 3/2014 | Hesse ..................... F02C 7/232 60/773 |
| 2015/0030464 | A1* | 1/2015 | Lemaitre ................ F01D 17/06 417/47 |

OTHER PUBLICATIONS

Odegard, B., et al.; "Industrial application of variable speed drive system for high speed in megawatt power range", Industry Applications Society Annual Meeting, 1994, Conference Record of the 1994 IEEE; Oct. 2-6, 1994, pp. 560-566, vol. 1, Digital Object Identifier 10.1109/IAS.1994.345464.

Power Engineering International, "Distributed Generation: The Parallon Solution", http://www.powerengineeringint.com/articles/print/volume-8/issue-10/features/distributed-generation-the-parallon-solution.html[Apr. 19, 2013 3:39:01 PM], Dated Jan. 11, 2000, 6 pp.

Siemens, "Industrial Power—Industrial Gas Turbines—The comprehensive product range from 5 to 50 megawatts", siemens.com/energy/gasturbines, Date Unknown, 8 pp.

Green Electric Power Corporation International; "Going Green Is Profitable Now!", Aiming for a green future, Date Unknown, 23 pp.

Flex Energy, "Flare Reduction—FlexEnergy turbines reduce oilfield flaring by generating clean power from stranded methane", http://www.flexenergy.com/flexenergy_flare_reduction.html [Apr. 22, 2013 1:42:30 PM], 2 pp.

Capstone Turbine Corporation, "Solutions—Resource Recovery: Oil and Gas", http://www.capstoneturbine.com/prodsol/solutions/rroilandgas.asp [Apr. 22, 2013 1:41:02 PM], 2 pp.

Sask Power, "Environmentally Preferred Technologies", http://www.saskpower.com/efficiency-programs-and-tips/generate-and-move-your-power/environmentally-preferred-technologies/[Apr. 19, 2013 3:21:48 PM], 5 pp.

General Electric, "Fire Power: GE Technology Turns Gas Flares Into Electricity", GE Reports, http://www.gereports.com/fire-power-ge-technology-turns-gas-flares-into-electricity [Apr. 19, 2013 3:17:41 PM], Nov. 29, 2011, 2 pp.

Case Study #2, Date Unknown, p. 263, 1 p.

Advanced Technology Group, "Microturbines for Power Generation—Technology Scan", (PE-Mech), NTPC, Date Unknown, 8 pp.

Green Field Energy Services, "Clean Turbine Pumping Technology", Jefferies Global Energy Conference, Houston, Texas, Nov. 28-29, 2012, 21 pp.

* cited by examiner

GAS TURBINE ENGINE OVERSPEED PREVENTION

CROSS-REFERENCE TO RELATED APPLICATIONS

This application claims the benefit of the following earlier-filed U.S. Provisional Application in accordance 35 USC 119: Application No. 61/781,493 entitled "METHODS AND SYSTEMS FOR DIGITALLY CONTROLLING TURBINE ENGINES, filed Mar. 14, 2013 in the names of Crowe et al. The entirety of the foregoing application is hereby incorporated herein by reference.

BACKGROUND OF THE INVENTION

1. Field of the Invention

The invention relates to gas turbine engines. More particularly, the invention concerns a novel approach to controlling gas turbine engines to prevent potentially destructive engine overspeed.

2. Description of the Related Art

If a gas turbine engine rotates at a speed beyond its design limits, this is known as overspeed. Depending on the make and model of engine, overspeed may be defined by a maximum rate of revolution and also possibly a duration of time.

It is undesirable to permit a gas turbine engine to overspeed, since this can damage or even destroy the engine. Overspeed frequently results from a defect or failure in a component of the gas turbine engine. Consequently, the best approach to address overspeed is to manually or automatically shut the engine down, in order to carry out repairs at a later time.

SUMMARY OF THE INVENTION

Broadly, the present disclosure concerns a controller for a gas turbine engine. The controller is configured to respond to one or more prescribed engine overspeed conditions. Rather than shutting the engine down, the controller substantially reduces N1 airflow and substantially concurrently activates one or more engine igniters. Some other aspects of the disclosure, for example, include a method, apparatus, logic circuitry, programmed product.

DETAILED DESCRIPTION

Figure 1:
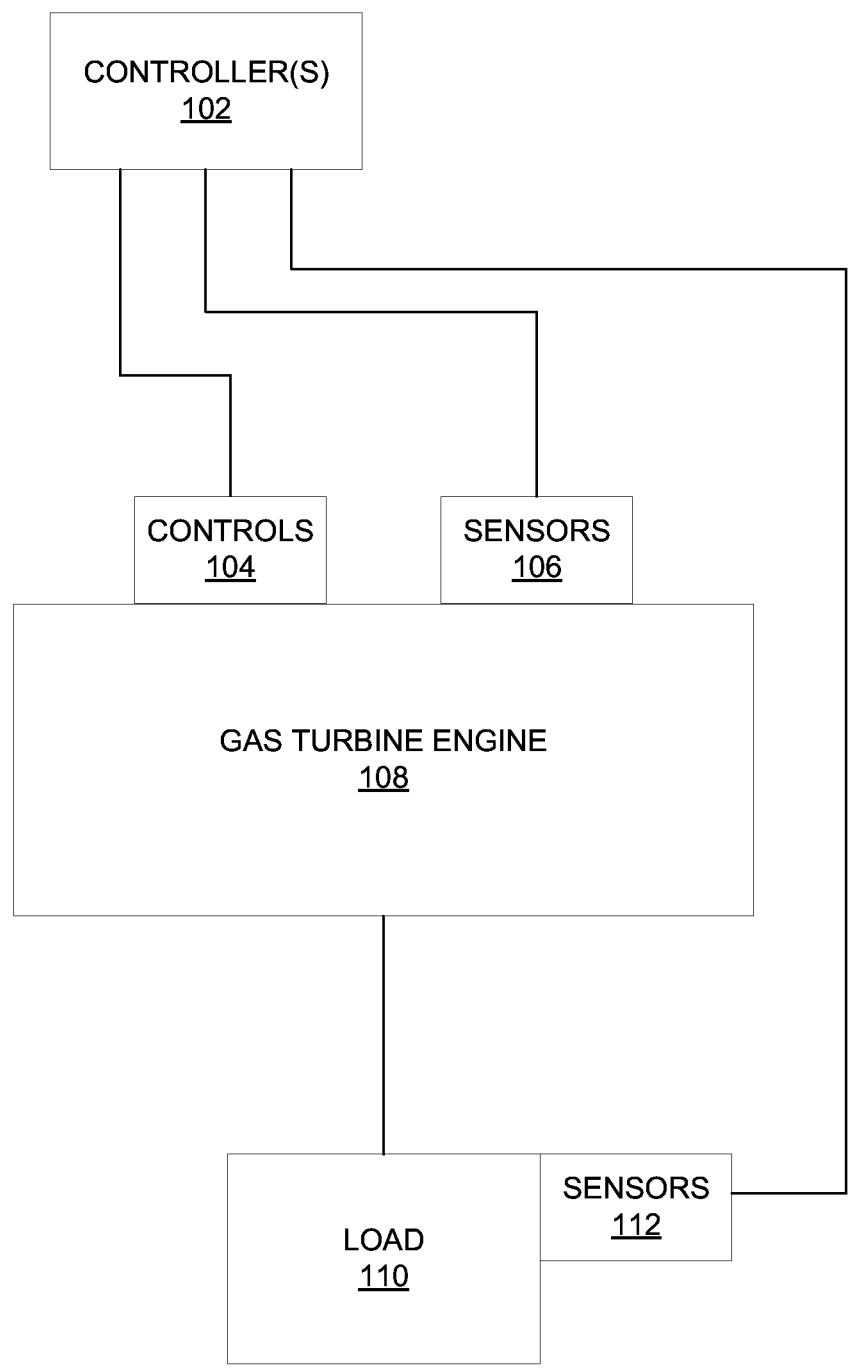
FIG. 1 is a block diagram of the components and interconnections of a gas turbine engine control system.

The nature, objectives, and advantages of the invention will become more apparent to those skilled in the art after considering the following detailed description in connection with the accompanying drawings.

Hardware Components and Interconnections

Overall Structure

One aspect of the present disclosure concerns a gas turbine engine driven system for accomplishing work. This system may be embodied by various hardware components and interconnections, with one example being described by the system 100 of FIG. 1.

Broadly, the exemplary system 100 includes a gas turbine engine 108 coupled to various controls 104 and sensors 104. At least one controller 102 manages operation of the engine 108. The engine 108 drives a load 110, which may be any conceivable device, machine, circuit, or other apparatus that is configured for, or amenable to configuration for, being driven by a gas turbine engine.

The system 100 includes various data processing components, which may be implemented in some or all of the following: the controller 102, controls 104, sensors 106, engine 108, and/or load 110. These data processing components may be implemented by one or more hardware devices, software or firmware devices, a portion of one or more hardware or software or firmware devices, or a combination of the foregoing. The makeup of these subcomponents is described in greater detail below, with reference to FIGS. 2-5.

Referring to FIG. 1 in greater detail, the engine 108 comprises an internal combustion turboshaft engine. Some examples, without any intended limitation, include the Honeywell model T53 or T55 engine.

The engine sensors 106 include devices for sensing or more conditions such as shaft speed, N1, N2, torque, oil pressure, oil temperature, hydraulic pressure, fuel level, flameout, gas flow, gear box clutch condition, turbine exhaust hatch configuration, fire suppression condition, water-in-fuel filter, exhaust hatch configuration, turbine brake condition, fire suppression solenoid position, fuel pump configuration, fuel pressure, exhaust gas temperature, diesel manifold pressure, diesel flow feedback, diesel manifold pressure, P3 pressure, NG flow feedback, battery voltage, oil filter delta pressure, oil level, oil chip detect, and others. Some exemplary engine sensors include thermocouples, resistance temperature detectors (RTDs), pressure transducers, speed pickups, chip detectors, vibration sensors, torque sensors, accelerometers, flow meters, and/or other applicable sensor devices. The sensors 106 may be connected to the controller 102 by any appropriate physical or wireless link, such as one or more cable harnesses, wires, fiber optic lines, busses, wireless network or other wireless connection, satellite link, radio link, Internet, etc.

The controls 104 comprise devices, inputs, busses, lines, simple relays, relays with relay feedback, solenoids, or other conceivable means configured or adaptable for use by the controller 102 to control components and accessories of the engine 108. The controls 104 include the various combustion inputs of the engine 108 as well as configuration of the engine and related hardware. Some exemplary controls 104 include fuel intake valve, bleed band, inlet guide vanes, central guide vanes, igniter, fuel injection rate, fuel flow control, starter solenoid, and shutoff valves, dual fuel switch, and the like.

Without any intended limitation, one example of the load 110 is an electrical generator or multiple generators. Another example of a load 110 is a fluid pump or multiple pumps.

Additionally, the system 100 may include one or more sensors 112 associated with the load 110. In the case of a generator as load 110, some exemplary sensors 112 include one or more voltmeters, current meters, frequency sensors, phase angle meters, power meters, and/or any other sensor or device appropriate to the application at hand. In the case of a pump as load 110, some exemplary sensors 112 include one or more flow meters, pressure transducers, valve feedback sensors, position sensors, any other sensor or device appropriate to the application at hand. As with the sensors 106, the sensors 112 may be connected to the controller 102 by any appropriate physical or wireless link.

Implementation of Data Processing Entities

As mentioned above, there are various data processing components in the system 100, and these may be implemented in some or all of the controller 102, controls 104, sensors 106, engine 108, and load 110. Furthermore, other components (not shown) of the system 100 may include smart features, and in this respect, include some data processing features. In any of these cases, such data processing features may be implemented by one or more hardware devices, software or firmware devices, a portion of one or more hardware or software or firmware devices, or a combination of the foregoing. The makeup of these subcomponents is described in greater detail below, with reference to FIGS. 2-5.

Exemplary Digital Data Processing Apparatus

Figure 2:
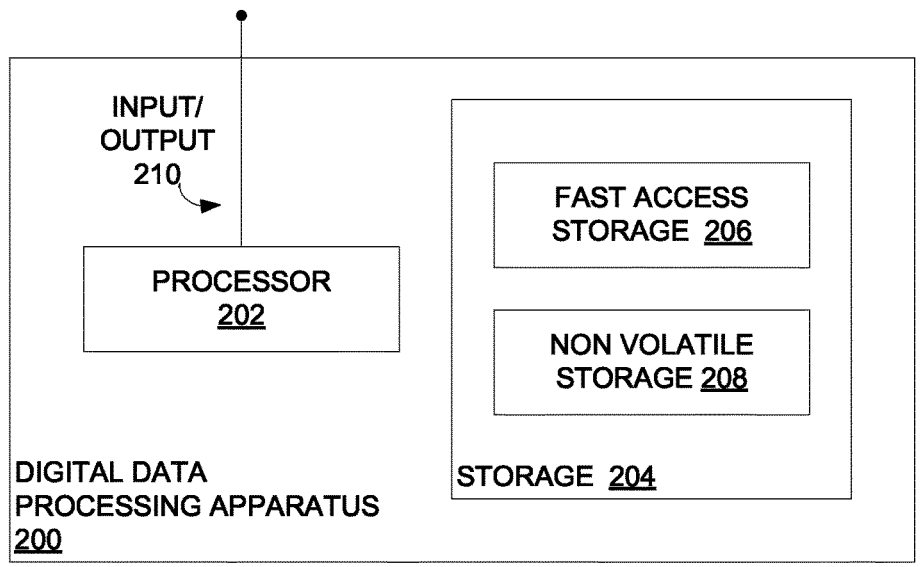
FIG. 2 is a block diagram of a digital data processing machine.
Figure 3:
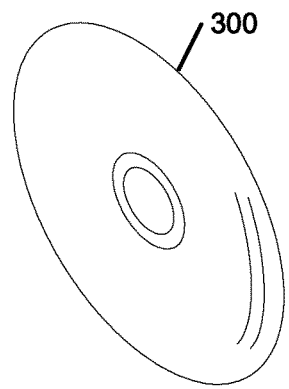
FIG. 3 shows a perspective view of an exemplary storage medium.

As mentioned above, the various data processing entities of FIG. 1 may be implemented by various processing engines. FIG. 2 shows one example, in the form of a digital data processing apparatus 200. The apparatus 200 may be implemented by a personal computer, customer circuit board, workstation, notebook computer, controller, microcontroller, state machine, or other processing machine appropriate to the requirements of the tasks explained herein. The apparatus 200 includes a processor 202, such as a microprocessor, controller, microcontroller, digital signal processor (DSP), application specific integrated circuit (ASIC), field programmable gate array (FPGA) or other programmable logic device, discrete gate or transistor logic, discrete hardware components, or any combination thereof designed to perform the functions described herein. The processor 202 may also be implemented as a combination of computing devices, such as a combination of a DSP and a microprocessor, a plurality of microprocessors, one or more microprocessors in conjunction with a DSP core, or any other such configuration.

The processor is coupled to digital data storage 204. In the present example, the storage 204 includes a fast-access storage 206, as well as nonvolatile storage 208. The fast-access storage 206 may be used, for example, to store the programming instructions executed by the processor 202. The storage 206 and 208 may be implemented by various devices, such as those discussed in greater detail below. Many alternatives are possible. For instance, one of the components 206, 208 may be eliminated; furthermore, the storage 204, 206, and/or 208 may be provided on-board the processor 202, or even provided externally to the apparatus 200.

The apparatus 200 also includes an input/output 210, such as a connector, line, bus, cable, buffer, electromagnetic link, network, modem, transducer, IR port, antenna, or other means for the processor 202 to exchange data with other hardware external to the apparatus 200.

Storage Media

As mentioned above, various instances of digital data storage may be used, for example, to provide storage used by the system 100 (FIG. 1), or to embody the storage 204 and 208 (FIG. 2), etc. Depending upon its application, this digital data storage may be used for various functions, such as storing data, or to store machine-readable instructions. These instructions may themselves aid in carrying out various processing functions, or they may serve to install a software program upon a computer, where such software program is then executable to perform other functions related to this disclosure.

In any case, the storage media may be implemented by nearly any mechanism to digitally store machine-readable signals. One example is optical storage such as CD-ROM, WORM, DVD, digital optical tape, disk storage 300 (FIG. 3), or other optical storage. Another example is direct access storage, such as a conventional "hard drive", redundant array of inexpensive disks ("RAID"), or another direct access storage device ("DASD"). Another example is serial-access storage such as magnetic or optical tape. Still other examples of digital data storage include electronic memory such as ROM, EPROM, flash PROM, EEPROM, memory registers, battery backed-up RAM, etc.

An exemplary storage medium is coupled to a processor so the processor can read information from, and write information to, the storage medium. In the alternative, the storage medium may be integral to the processor. In another example, the processor and the storage medium may reside in an ASIC or other integrated circuit.

Logic Circuitry

In contrast to storage media that contain machine-executable instructions, as described above, a different embodiment uses logic circuitry to implement processing capability or smart features.

Depending upon the particular requirements of the application in the areas of speed, expense, tooling costs, and the like, this logic may be implemented by constructing an ASIC having thousands of tiny integrated transistors. Such an ASIC may be implemented with CMOS, TTL, VLSI, or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

Figure 4:
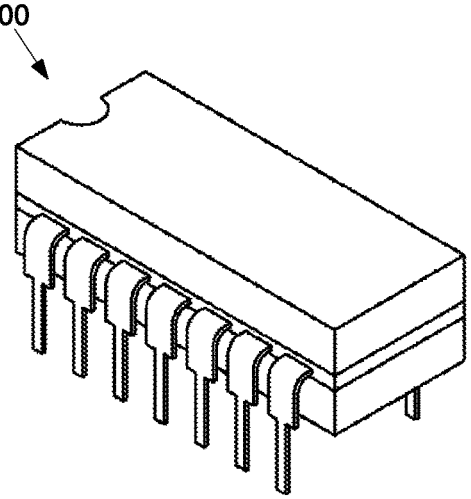
FIG. 4 is a perspective view of exemplary logic circuitry.
Figure 5:
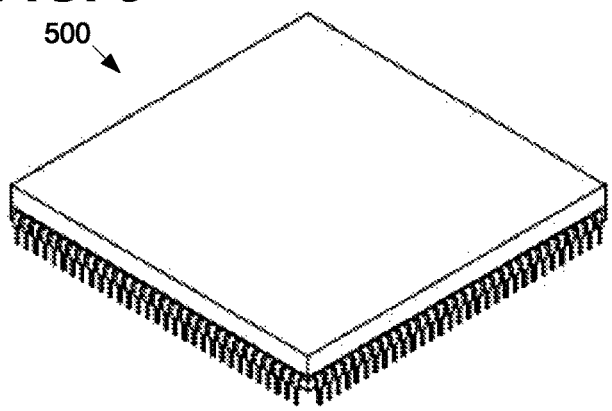
FIG. 5 is a perspective view of a field programmable gate array.

FIG. 4 shows an example of logic circuitry in the form of an integrated circuit 400. FIG. 5 shows an example of logic circuitry in the form of an FPGA 500.

Operation

Having described the structural features of the present disclosure, an operational aspect of the disclosure will now be described. The steps of any method, process, or algorithm described in connection with the embodiments disclosed herein may be embodied directly in hardware, firmware, software executed by hardware, circuitry, or a combination of these.

Novel Operational Strategy

The present inventors observed that, when the vast majority of gas turbine engines experience an overspeed condition, this means that the engine or a subcomponent of the engine has failed. In this situation, it does not make sense to continue operating the engine, since engine damage is likely to occur. For example, in aviation applications, when an engine overspeed happens it is indisputable that the engine must be shut down promptly.

Along these lines, engine operating guidelines from manufacturers such as Honeywell and Lycoming contain specific instructions detailing the procedure for responding to engine overspeed, which invariably includes shutting the engine down. Others have even applied techniques such as liquid nitrogen or mechanical brakes to speed process for shutting down an engine under these circumstances.

However, the present inventor made numerous important discoveries applicable to the unique application of gas combustion engines in a turbo-generation system. For example, the inventor discovered that when a gas turbine engine is applied to drive an electrical generator, overspeed can be a natural result of an abrupt change in the turbo-generator's electrical load. This abrupt change may be referred to as "load dump," and this refers to a situation where the turbo-generator's load effectively disappears. As the present inventor has discovered, load dump in a turbo-generation system can occur when the overall generation system is removed from the grid, or a breaker is disconnected, or when one turbo-generator operating in parallel with other turbo-generators fails or is taken offline.

The present inventor also discovered that reflexively shutting a turbo-generator down can result in undesirable system downtime that is costly in terms of lost electrical output as well as manpower required to diagnose and repair a nonexistent problem. Consequently, the present inventor took an approach that diverges sharply from the conventional method of operating turbo-generators, by finding a way to somehow compensate for engine overspeed in order to keep the engine running. Accordingly, the inventor discovered that in a turbo-generation system it can be beneficial to continue operating the engine after the overspeed if the overspeed can be contained.

In this context, the following operational sequences describe some examples of processes designed to safely keep a gas combustion turbo-generator running in spite of overspeed.

Operational Example #1

Figure 6:
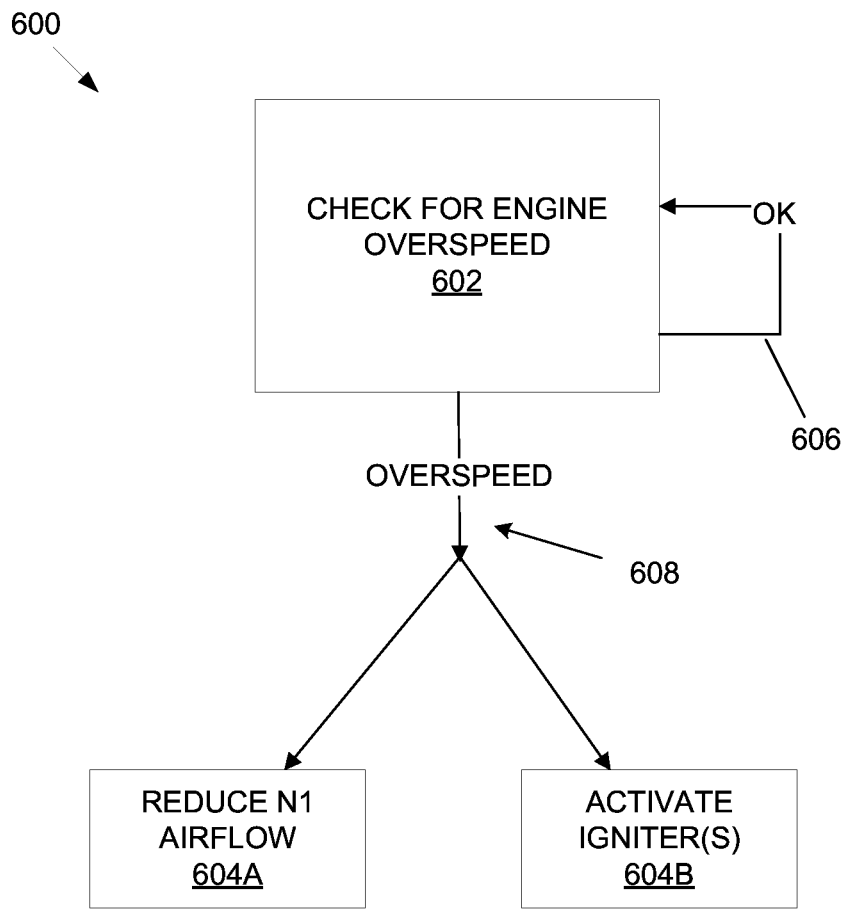
FIG. 6 is a flowchart of an operational sequence for controlling a gas turbine engine, according to a first example.

FIG. 6 shows a sequence 600 to illustrate one exemplary method aspect of this disclosure. Broadly, this sequence responds to engine overspeed conditions, not by shutting the engine down, but by substantially reducing N1 airflow and substantially concurrently activating one or more engine igniters. This has the effect of keeping the engine operating while avoiding potential damage that would have been caused by continued engine overspeed.

For ease of explanation, but without any intended limitation, the example of FIG. 6 is described in the specific context of the system 100 described above. In step 602, the controller 102 checks for engine overspeed. Namely, the controller 102 consults with an appropriate one or more of the sensors 106 to determine engine speed. The sensed speed may be, for example, engine output shaft speed, or a combination of engine output shaft speed and a measure of internal rotational speed. Other measures of speed, such as N1 or N2 may be used instead. A weighted combination of any of the foregoing speed measures may be used as a representation of engine speed. Moreover, engine speed may be instantaneous or averaged over a given period. For ease of explanation, the term "overspeed" is used throughout, with the understanding that overspeed may be calculated in a variety of ways beyond simple instantaneous speed of the engine.

In step 602, the controller 102 compares the measured engine speed to a prescribed speed threshold. According to the application at hand, the prescribed threshold may use a combination of speed and time, e.g., a given RPM for a given time. In one example, the threshold is satisfied by reaching 92% of a manufacturer specified maximum engine output RPM for any period of time. In another example, the threshold is satisfied by reaching 85% of a manufacturer specified maximum engine output RPM for one minute.

If step 602 finds that the engine is not exceeding the prescribed threshold, then step 602 repeats as shown by 606. Step 602 may be repeatedly invoked, on any appropriate schedule that is periodic, non-periodic, event driven, etc. Or, step 602 may instead be performed continuously.

If step 602 finds the engine speed exceeds the prescribed threshold, then step 602 advances (608) to perform steps 604a and 604b. In the illustrated example, steps 604a-604b are performed concurrently, but they may be performed in series or any other beneficial order.

In step 604a, the controller 102 directs the appropriate controls 104 to reduce N1 airflow. These steps may be performed in the order discussed below, or in a different order, or substantially concurrently. As one part of step 604a, the controller 102 cuts the engine's fuel input to idle. This is achieved, for example, by the controller 102 sending an appropriate signal to the fuel intake valve control 104. The slows airflow, helping to reduce engine speed. As another part of step 604a, the controller 102 partially or completely opens one or more engine bleed bands by sending a signal to the appropriate engine control 104. This reduces the output of the turbine by throwing N1 rotational energy overboard to prevent N2 rotation. As a further part of step 604a, the controller 102 constricts one or more inlet guide vanes by sending a signal to the appropriate engine control 104. This helps to create a vacuum, reducing N1 and further slowing engine output.

In step 604b, the controller 102 directs the appropriate controls 104 to activate some or all of the engine's igniters. Namely, the controller 102 actives some or all of the engine igniters by sending an appropriate signal to the engine igniter controls 104. This prevents flameout, which may otherwise occur due to the above-mentioned subparts of step 604a. The igniters are activated for a predetermined duration of time, such as four seconds. Alternatively, the igniters may be activated until a given pre-programmed event or condition occurs.

The result of performing steps 604a-604b is to substantially reduce engine speed, while continuing operation of the engine.

Operational Example #2

Figure 7:
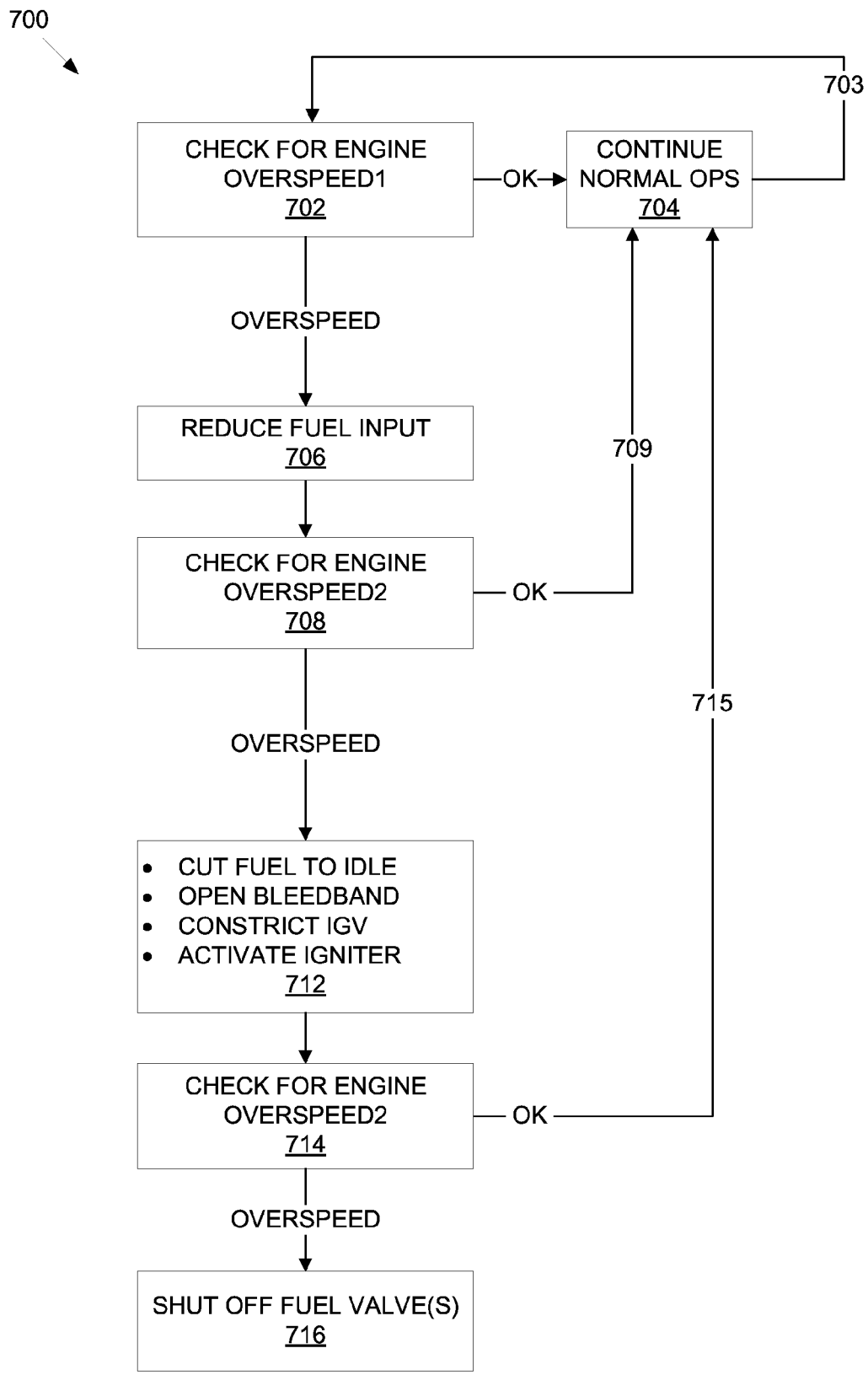
FIG. 7 is a flowchart of an operational sequence for controlling a gas turbine engine, according to a second example.

FIG. 7 shows a sequence 700 to illustrate another exemplary method aspect of this disclosure. As with the sequence of FIG. 6, the sequence of FIG. 7 responds to engine overspeed conditions, not by shutting the engine down, but by substantially reducing N1 airflow and substantially concurrently activating one or more engine igniters. This has the effect of keeping the engine operating while avoiding potential damage by continued engine overspeed. Unlike FIG. 6, the sequence 700 includes some less severe preliminary measures, attempting to gain control of engine overspeed, as discussed below.

For ease of explanation, but without any intended limitation, the example of FIG. 7 is described in the specific context of the system 100 described above. In step 702, the controller 102 checks for presence of a first engine overspeed condition. The overspeed condition refers to a threshold of speed and optionally a duration of time. This is conducted in similar fashion as step 602, except that the first engine overspeed condition (here) is lower than the overspeed from step 602. In this example, the first prescribed threshold is 90% of a manufacturer specified maximum engine output RPM for any duration.

If step 702 finds that the engine speed is not exceeding the first prescribed threshold, then the controller 102 continues normal operations as shown by step 704. Step 704 may include resumption of normal fuel input.

After resuming normal operations, step 702 repeats, as shown by 703. Step 702 may repeat on any appropriate schedule that is periodic, non-periodic, event driven, etc. Or, step 703 may instead be performed continuously.

Whenever step 702 finds the engine speed exceeds the first prescribed threshold, then step 702 advances to step 706. In step 706, the controller 102 acts to substantially reduce fuel input to the engine. In one example, this is achieved by the controller 102 providing a reduced electrical signal to the fuel intake valve control 104. For example, step 702 may act to reduce fuel input by around 88%, or in other words, reducing fuel input to around 12% of the level that was being applied when overspeed occurred. Owing to the overspeed condition, reducing fuel input in step 706 does not cause a flameout.

In many cases, the result of performing step 706 will be a marked reduction in engine speed. Accordingly, in step 708 the controller 102 re-checks engine speed in step 708. This may be achieved as in step 702, except that a second prescribed threshold is used. The second threshold is faster, longer in duration, or a combination of these representing a greater rotational energy than the first threshold. In one example, the second threshold is 92% of the manufacturer specified maximum engine output RPM for any duration of time.

If step 708 finds that the engine is not exceeding the second prescribed threshold, then as shown by 709, the controller 102 continues normal operations in step 704. Following step 704, to continue monitoring engine speed, the controller 102 repeats step 702 as discussed above. As an alternative, step 708 may be repeated instead of step 702. Step 702 (or step 708 as appropriate) may repeat on any appropriate schedule that is periodic, non-periodic, event driven, etc., or this step may be performed continuously.

In contrast, whenever step 708 finds that engine speed exceeds the second prescribed threshold, then step 708 advances to step 712. Here, the controller 102 takes further, specific steps to reduce engine speed. These steps may be performed in the order illustrated below, or in a different order, or substantially concurrently.

As one part of step 712, the controller 102 cuts the engine's fuel input to idle. This is achieved, for example, by the controller 102 sending an appropriate signal to the fuel intake valve control 104. The slows airflow, helping to reduce engine speed.

As another part of step 712, the controller 102 partially or completely opens one or more engine bleed bands by sending a signal to the appropriate engine control 104. This reduces the output of the turbine by throwing N1 rotational energy overboard to prevent N2 rotation.

As another part of step 712, the controller 102 constricts one or more inlet guide vanes by sending a signal to the appropriate engine control 104. This helps to create a vacuum, reducing N1 and further slowing engine output.

As another part of step 712, the controller 102 actives some or all of the engine igniters by sending an appropriate signal to the engine igniter controls 104. This prevents flameout, which may otherwise occur due to the above-mentioned subparts of step 702. The igniters are activated for a predetermined duration of time, such as four seconds. Alternatively, the igniters may be activated until a given preprogrammed event or condition occurs.

After step 712, the controller 102 checks engine overspeed in step 714. In this example, step 714 repeats the analysis of step 708, using the same prescribed threshold from step 708. In a different implementation, another threshold may be used instead. If step 714 finds that the engine is not exceeding the applicable threshold, then the controller 102 resumes normal operations in step 704. To continue monitoring engine speed, the controller 102 may employ a repeated performance of step 702 as discussed above, or step 708. Step 702 (or step 708 as appropriate) may repeat on any appropriate schedule that is periodic, non-periodic, event driven, etc., or it may be performed continuously.

In contrast to the foregoing, if step 714 finds that engine speed is still exceeding the implemented threshold, then step 716 shuts the engine down. Namely, the controller 102 sends an appropriate signal to the fuel valve controls 104 to stop fuel flow to the engine. In this situation, which describes persistent and unresponsive engine overspeed, the engine overspeed is probably not the result of a change in load, but rather an entirely different situation that cannot be resolved by changing engine configuration. Some possible examples of these situations include a sticky fuel control valve, contamination in the fuel line or fuel control valve, failure of the engine or engine component, etc.

In a different embodiment of the sequence 700, all steps prior to step 708 are omitted, in which case only one prescribed engine speed threshold is applied.

Other Embodiments

While the foregoing disclosure shows a number of illustrative embodiments, it will be apparent to those skilled in the art that various changes and modifications can be made herein without departing from the scope of the invention as defined by the appended claims. Accordingly, the disclosed embodiment are representative of the subject matter which is broadly contemplated by the present invention, and the scope of the present invention fully encompasses other embodiments which may become obvious to those skilled in the art, and that the scope of the present invention is accordingly to be limited by nothing other than the appended claims.

All structural and functional equivalents to the elements of the above-described embodiments that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 USC 112, sixth paragraph, unless the element is expressly recited using the phrase "means for" or, in the case of a method claim, the phrase "step for."

Furthermore, although elements of the invention may be described or claimed in the singular, reference to an element in the singular is not intended to mean "one and only one" unless explicitly so stated, but shall mean "one or more". Additionally, ordinarily skilled artisans will recognize that operational sequences must be set forth in some specific order for the purpose of explanation and claiming, but the present invention contemplates various changes beyond such specific order.

In addition, those of ordinary skill in the relevant art will understand that information and signals may be represented using a variety of different technologies and techniques. For example, any data, instructions, commands, information, signals, bits, symbols, and chips referenced herein may be represented by voltages, currents, electromagnetic waves, magnetic fields or particles, optical fields or particles, other items, or a combination of the foregoing.

Moreover, ordinarily skilled artisans will appreciate that any illustrative logical blocks, modules, circuits, and process steps described herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

This specification has been set forth with various headings and subheadings. These are included to enhance readability and ease the process of finding and referencing material in the specification. These heading and subheadings are not intended, and should not be used, to affect the interpretation of the claims or limit claim scope in any way.

The invention claimed is:

1. A method for controlling a gas turbine engine, comprising operations of: responsive to the engine reaching a first prescribed engine overspeed condition, managing the engine by conducting operations comprising:
   cutting fuel input to idle;
   partially or completely opening one or more bleed bands;
   constricting inlet guide vanes;
   activating one or more engine igniters for a prescribed duration; and
   responsive to abatement of the first engine overspeed condition or a second overspeed condition avoiding shutdown of the engine and continuing to operate the engine.

2. An apparatus, comprising computer readable storage containing non-transitory storage of at least one program to perform the operations of claim 1.

3. An apparatus, comprising circuitry of multiple interconnected electrically conductive elements configured to perform the operations of claim 1.

4. The apparatus of claim 3, the circuitry comprising a field programmable gate array.

5. An apparatus, comprising:
   a controller for a gas turbine engine configured to manage the gas turbine engine by performing the operations of claim 1.

6. The method of claim 1 or the apparatus of claim 2 or the apparatus of claim 3 or the apparatus of claim 5, the operations further comprising:
   limiting performance of the opening, constricting, and activating operations to situation where the cutting operation fails to achieve abatement of the first engine overspeed condition.

7. The method of claim 1 or the apparatus of claim 2 or the apparatus of claim 3 or the apparatus of claim 5, the operation of substantially reducing fuel input to the engine comprising reducing fuel input by about 87.5%.

8. The method of claim 1 or the apparatus of claim 2 or the apparatus of claim 3 or the apparatus of claim 5, the operations further comprising:
   determining engine speed by utilizing one of the following or a combination of multiple of the following instantaneous or averaged measurements: internal engine speed, engine speed taken at an output shaft, N1, N2.

9. The method of claim 1 or the apparatus of claim 2 or the apparatus of claim 3 or the apparatus of claim 5, where the opening, constricting, and activating operations are performed substantially concurrently.

10. The method of claim 1 or the apparatus of claim 2 or the apparatus of claim 3 or the apparatus of claim 5, where the first and second prescribed overspeed conditions comprise first and second predetermined rotational energies of the engine.

11. A method for controlling a gas turbine engine, comprising operations of: responsive to sensing a prescribed engine overspeed condition, avoiding shutting down the engine and instead performing operations comprising substantially reducing N1 airflow and substantially concurrently activating one or more engine igniters.

12. An apparatus, comprising computer readable storage containing non-transitory storage of at least one program to perform the operations of claim 11.

13. An apparatus, comprising circuitry of multiple interconnected electrically conductive elements configured to perform the operations of claim 11.

14. The apparatus of claim 13, the circuitry comprising a field programmable gate array.

15. An apparatus, comprising:
   a controller for a gas turbine engine configured to manage the gas turbine engine by performing the operations of claim 11.

16. The method of claim 11 or the apparatus of claim 12 or the apparatus of claim 13 or the apparatus of claim 14, where the operations further comprise: substantially but not completely reducing fuel input to the engine responsive to the prescribed engine overspeed condition, and only in the event the prescribed engine overspeed condition does not abate responsive to said reducing fuel input to the engine, thereafter performing said operations of reducing N1 airflow and substantially concurrently activating one or more engine igniters.

17. A controller configured to manage a gas turbine engine by performing operations comprising:
   responsive to the engine reaching a first prescribed engine overspeed condition, reducing engine fuel input to a predetermined idle level;
   checking whether the engine is running at less than a second overspeed condition, and if so, configuring the engine for predefined normal ongoing operations, otherwise performing operations comprising:
   partially or completely opening one or more bleed bands;
   constricting inlet guide vanes;
   activating one or more engine igniters for a prescribed duration; and
   after completing the cutting, opening, constricting, and activating operations, checking whether the engine has reached the second engine overspeed condition, and if so, configuring the engine for the predefined normal ongoing operations, otherwise shutting down the engine.

* * * * *